(No Model.)
E. WESTON.
ELECTRIC CURRENT INDICATOR.
No. 340,403. Patented Apr. 20, 1886.
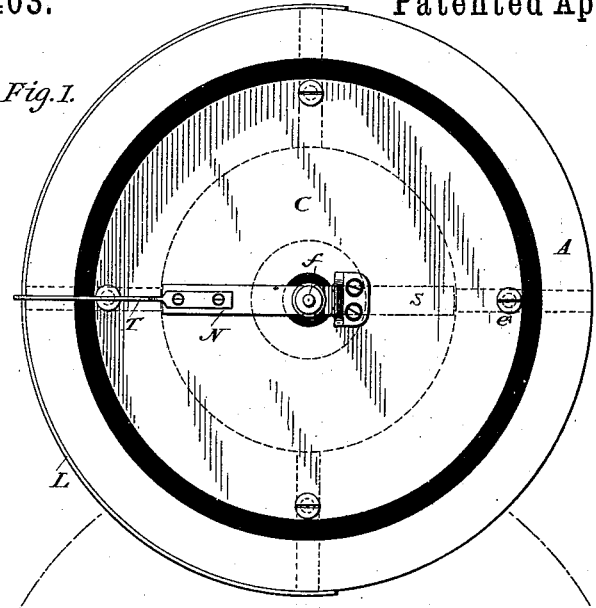
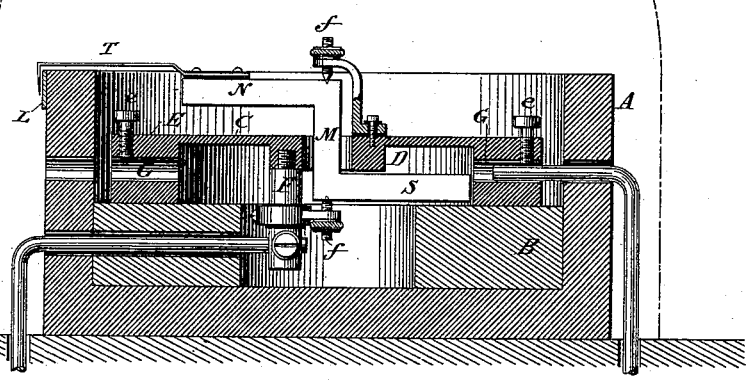
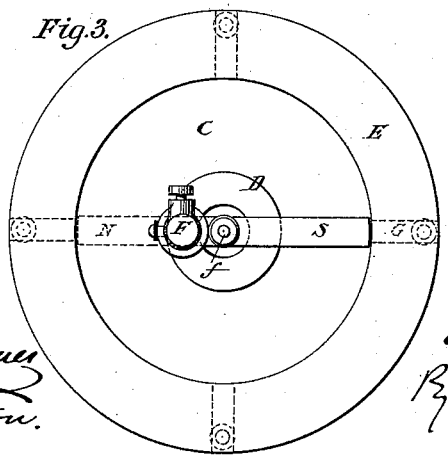
WITNESSES,
Raymond F. Barnes
J. Daniel Compton
INVENTOR.
Edward Weston
By Parker W. Page,
ATTORNEY.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRIC-CURRENT INDICATOR.

SPECIFICATION forming part of Letters Patent No. 340,403, dated April 20, 1886.

Application filed January 14, 1886. Serial No. 188,555. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Current-Indicators, of which the following is a specification, reference being had to the drawings accompanying and forming a part of the same.

The object of my invention is to secure a cheap, simple, and effective device for indicating current changes in circuits carrying currents of great strength or volume. Many instruments have been devised for this purpose; but nearly all are objectionable on account of their complicated character. The greatly-increased demand for such instruments and the immense number now required in use render it extremely important to produce an instrument at a low cost, and which, while of the simplest possible mechanical construction, shall yet be accurate and sensitive as an ampère-meter or current-indicator. To this end I have devised an apparatus which in the main consists of a disk of good conducting metal, with which appliances are connected for completing the circuit through it from the center to several points at or near its edge. Through the center of the disk is a perforation, and a magnetic bar is mounted close to the disk, with its two ends on the opposite faces of the same, and the cross-piece which is at right angles to the ends passing through the perforation. One end of the bar carries a pointer, which sweeps over a graduated scale, and the whole is inclosed in a cast-iron box, to prevent outside magnetic influences from affecting the movement of position of the bar.

The specific character of this device and its mode of operation will be described by reference to the accompanying drawings.

Figure 1 is a plan view of the instrument. Fig. 2 is a central cross-section of the same, and Fig. 3 is a plan view of the under side of the disk.

A is a cast-iron box, in which the instrument is placed on an insulating-block, B.

C is a copper disk, having a central hub, D, and a heavy peripheral flange, E.

A binding-screw, F, serves to connect the central part of the disk with one of the circuit-terminals. A number of sockets, G, are formed in the periphery, and provided with binding-screws e, which are for receiving the ends of branches of the other circuit-terminal. Currents passing over the circuit will therefore enter the disk near its center and pass out through the several branches, or conversely. It will be of course practically impossible to obtain an even distribution of the current to the several branches; but for all practical purposes this is not required. Through the central hub is a perforation, and through this is passed a magnetic bar composed of three straight sections—two parallel ends, N S, joined by a short right-angled section, M. The bar is mounted by pivoting-screws $f f$, with the part M at right angles to the plane of the disk, with the ends N S lying close to the opposite faces of the disk. One of the ends, N, carries a pointer, T, that is caused to sweep over a graduated scale, L, by the movement of the bar.

If the instrument be connected in circuit in the manner described, so that currents will pass through the disk from center to periphery, or conversely, a movement is imparted to the bar in consequence of the tendency which it has of assuming a position at right angles to the direction of the current, and it assumes a position dependent upon the strength of current. Any variation in current strength is attended by a change in the position of the bar.

The instrument may be placed with the bar in the magnetic meridian, or so that the bar may move in a vertical plane, and in this case if the said plane does not correspond with the meridian the bar may be weighted sufficiently to neutralize the directive tendency of terrestrial magnetism.

The particular construction of this device is well adapted to securing the greatest simplicity in the means for mounting the magnetic bar, for making the necessary adjustments, and securing the maximum effect of the current upon the bar. The latter may and should be placed very close to the disk, and as evenly balanced as possible.

What I claim is—

1. In a current-indicator, the combination, with a conducting-disk with electrical connections for passing a current from its center to periphery, or conversely, of a magnetic bar passing through and pivoted at the center of the disk, and bent so that its ends lie close to opposite sides of the disk, and a scale for indicating changes in the position of the bar incident to variations in the strength of the current passing through the disk, as set forth.

2. In a current-indicator, the combination, with a conducting-disk thickened at its center and around its edge, and provided with means for forming circuit-connections at these places, of a magnetic bar passing through a perforation at the center of the disk, and supported by pivots placed above and below the disk, the bar being bent or formed so that its polar ends lie close to the opposite faces of the disk, and a scale for indicating changes in the position of the bar, as herein described.

3. The combination, with a current-indicator composed of a conducting-disk having means for passing a current through it from center to periphery, or conversely, and a pivoted magnetic bar passing through the center of the disk, and bent or formed so that its polar ends lie close to the opposite faces of the disk, of an iron box inclosing the said indicating mechanism for protecting the same from external magnetic influences, as set forth.

EDWARD WESTON.

Witnesses:
HENRY A. BECKMEYER,
RICHARD WM. BLOEMEKE.